Figure 1:
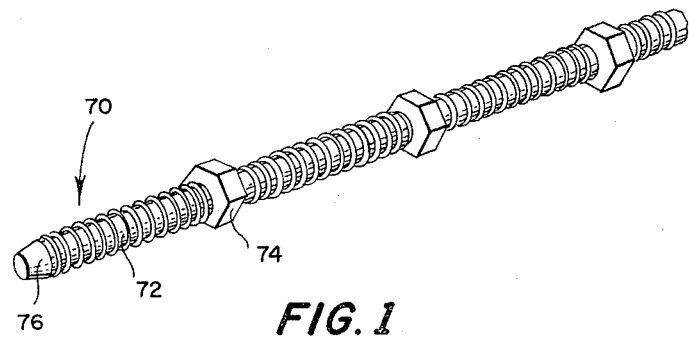

Nov. 15, 1966     H. C. BRAUCHLA     3,284,825

METHOD OF FORMING SCREW STRIP

Filed Feb. 25, 1966     4 Sheets-Sheet 1

INVENTOR
HERBERT C. BRAUCHLA

BY Semmes & Semmes

ATTORNEYS

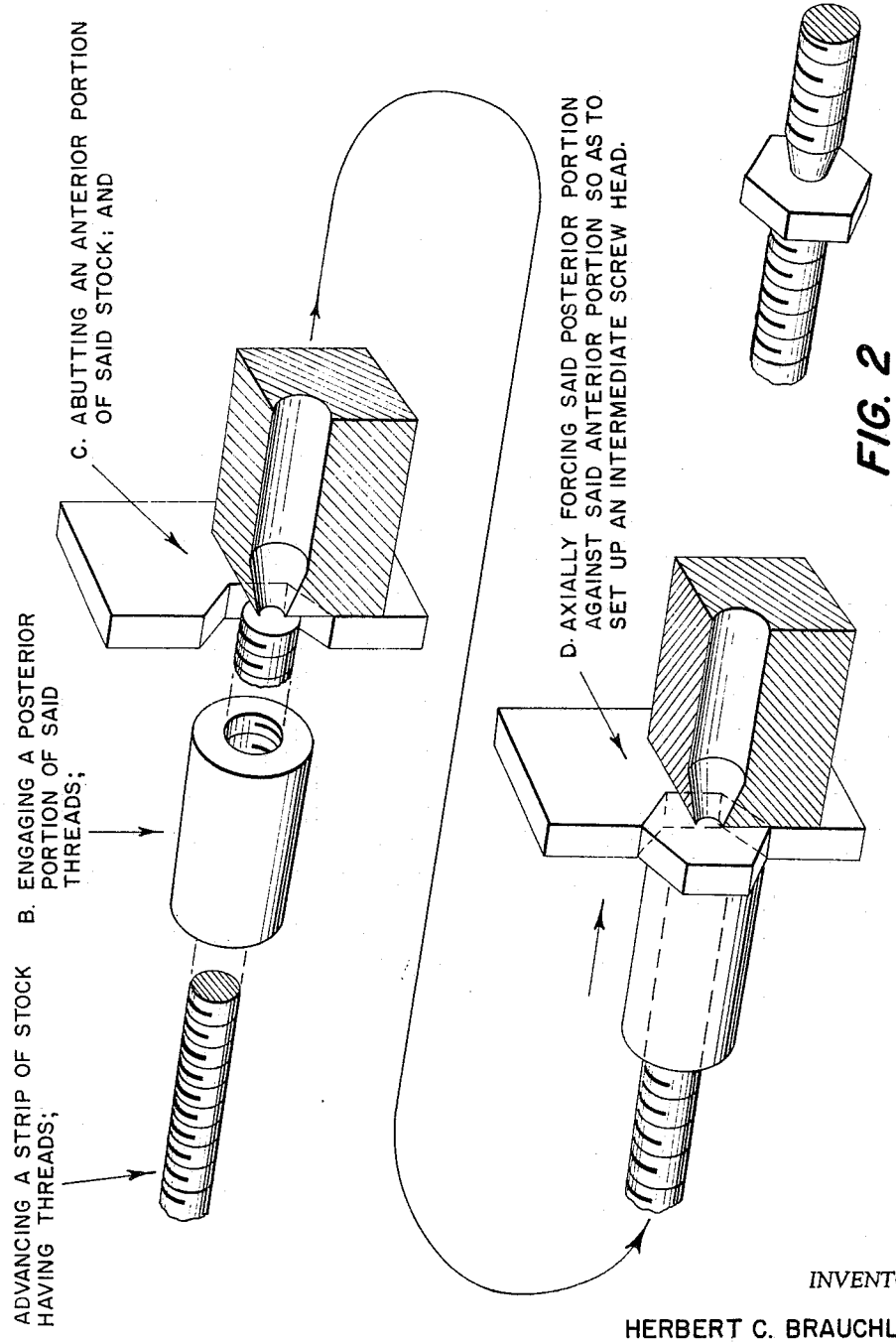

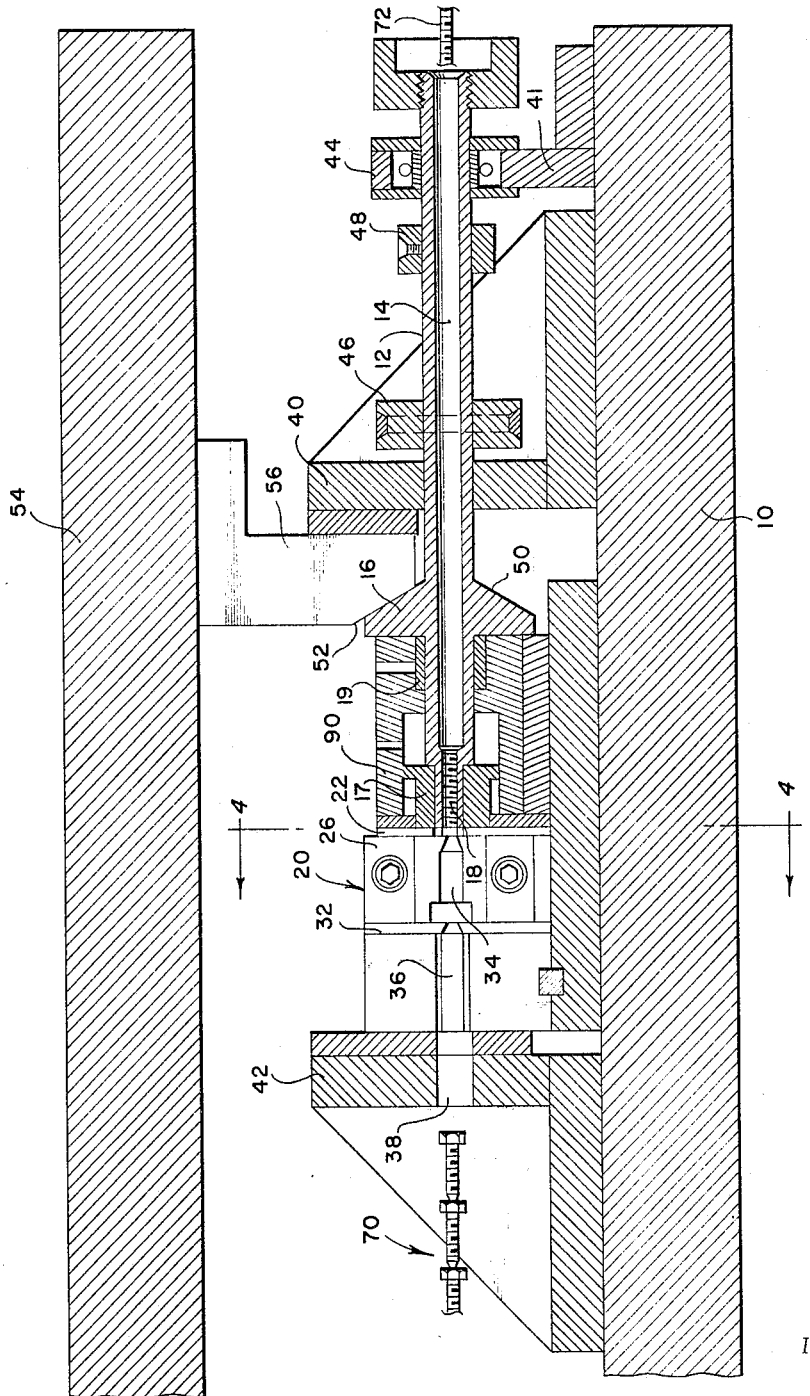

Nov. 15, 1966 H. C. BRAUCHLA 3,284,825
METHOD OF FORMING SCREW STRIP
Filed Feb. 25, 1966 4 Sheets-Sheet 4

INVENTOR
HERBERT C. BRAUCHLA
BY Semmes & Semmes
ATTORNEYS

United States Patent Office 3,284,825
Patented Nov. 15, 1966

3,284,825
METHOD OF FORMING SCREW STRIP
Herbert C. Brauchla, P.O. Box 349, Fremont, Ohio
Filed Feb. 25, 1966, Ser. No. 530,132
10 Claims. (Cl. 10—10)

This invention relates to a method of forming screw strip, particularly a method of forming a strip of co-axially aligned screws from threaded wire stock.

Numerous previous methods have been devised for forming screw strip. However, primary attention has been given to the heading operation, that is, the forming of the screw head prior to the forming of threads. This is the result of a general belief that heads could not be formed subsequently of threading without damaging the threads. According to one school of invention, the screw strip is formed from square, hexagonal or like stock having a cross-section of the desired screw head. The threads are simply cut out of the stock, leaving screw head portions at the desired intervals. This is wasteful of stock, time consuming and expensive; also, the actual cutting of the threads can result in the axial mis-alignment of the screw heads. According to another school, the screw heads and screw strip shanks are blanked simultaneously, then threads are coined into the sides of the shank. Needless to say, this coining of threads results in an imperfect thread and the simply blanked heads are not entirely satisfactory.

According to applicant's method, threads are formed in wire stock by any conventional means, for example, by pairs of rollers having annular threaded grooves or by end feeding heads such as manufactured by Threading Tool Division, the National Acme Company, Cleveland, Ohio, 41408. The threaded wire stock is then advanced axially, a sustained posterior portion of the threads are grabbed, while an anterior portion of the threads is abutted, and the posterior portion is forced co-axially against the abutted portion so as to set up within a die head an intermediate screw head. If desired, a shear point can be set up adjacent the screw head. The threaded screw stock is introduced into a rotating head having circumferential interior threads. This rotating of the head causes the threaded stock to advance axially and enables the threads to be grabbed over a sustained longitudinal portion without damaging the threads. For example, a posterior portion of the advancing stock may be grabbed in one inch, two inch, four or six inch increments, regardless of the size of the actual screw shank to be formed. This large scale gripping capability is particularly advantageous in the manufacture of short-shank screws.

Accordingly, it is an object of invention to provide a method for forming of screw strips wherein the heading is perfected sequentially of threading.

Another object of invention is to provide a method of forming a strip of co-axially aligned screws wherein at least one threaded portion is forced co-axially against another portion so as to set up an intervening screw head.

Figure 4:
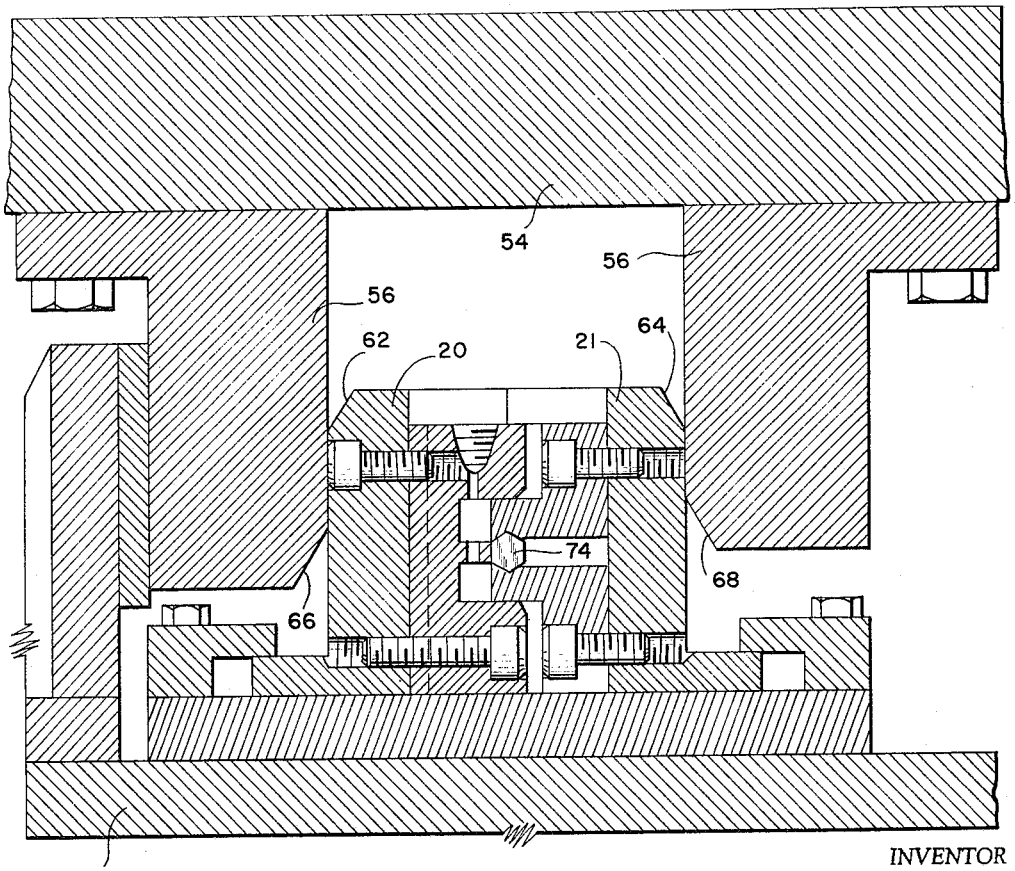
Figure 5:
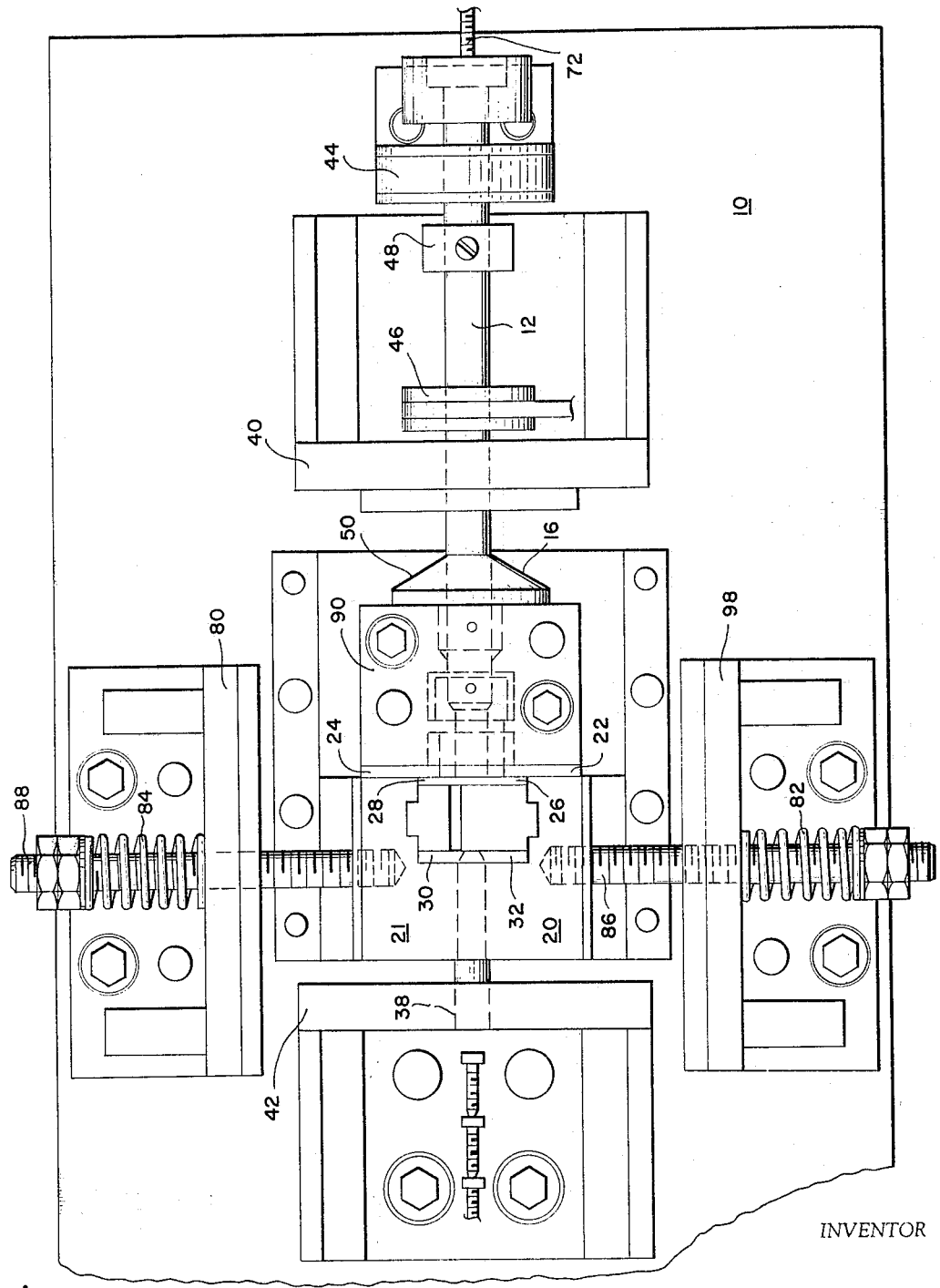

Yet, additional objects of invention will become apparent from the ensuing specification and attached drawings, wherein:

FIG. 1 is a fragmentary perspective of a screw strip;
FIG. 2 is a schematic view of applicant's method;
FIG. 3 is a longitudinal section of a proposed apparatus for advancing the screw strip, grabbing a posterior portion of the strip and abutting an anterior portion of strip so as to set up an intervening screw head and shear point within intervening die elements;
FIG. 4 is a sectional view taken along section line 4—4 of FIG. 3; and
FIG. 5 is a top plan.

As illustrated in FIG. 1, screw strip 70 is formed from a wire stock having continuous thread 72. The strip is composed of co-axially aligned individual screws having heads 74 with adjacent shear points 76. This type of screw strip is utilizable in various conventional automatic or power driven screw drivers.

The apparatus proposed in FIG. 3 includes a base 10 supported by means of blocks 40 and 41 a mandrel 12. Mandrel 12 includes a hollow axial bore 14, a concave exterior head 16 and an interiorally threaded reduced diameter portion 18. Mandrel 12 may rest within mandrel block 90, bushings 17 and 19 and at its feeding end may be mounted in field bearing 44 supported upon block 41. Forward of mandrel block 90 is situated a pair of heading dies 20 and 21, supporting individual heading chasers 22 and 23, primary shear point knives 26 and 28 and secondary shear point knives 30 and 32. Intermediate the primary and secondary shear point knives there is a screw shaped chamber 34 of enlarged dimensions so as to facilitate the axial passage of the individual screw head and threaded shank without engaging the thread 72 or damaging it in any way. Sequentially of secondary shear point knives 30 and 32 there is a similar enlarged discharge bore 36 and a discharge passage 38 within block 42.

As illustrated in FIG. 3, threaded bar stock is advanced axially from right to left into mandrel 12 interior bore 14 so as to engage interior threaded portion 18. Mandrel 12 may be rotated by means of pulley 46. Rotation of mandrel 12 causes the threaded stock to advance from right to left until it abuts a stop (not illustrated) without the die. Then, the entire mandrel and screw strip is forced co-axially towards the point of abutment by the downward thrust of die head 54 having inclined shoulder 52 which engages complementary inclined shoulder 15 of mandrel 16. Simultaneously, the heading chasers 22 and 24, as well as primary shearing knives 26 and 28 and secondary shearing knives 30 and 32 are driven together by depending drivers 58 and 56, with inclined shoulders 66 and 68 respectively engaging complementary inclined shoulders 62 and 64 in die elements 20 and 21. This downward thrust of die head 54 simultaneously advances the screw strip co-axially while closing the die elements about that portion of the screw strip wherein the head is to be set up and the shear point formed. While die elements 20 and 21 are closed the rotating action of mandrel 16 may be cut off, then as the die elements are opened, mandrel 16 may be rotated again by means of a tension belt or various optional driving means. Thus, as the die head 54 is raised, mandrel 12 is again engaged so as to re-advance an increment of strip. Prior to the heading operation, axial movement of mandrel 16 may be limited by circumferential spacer ring 48 adjustable by means of a set screw or the like.

Upon release of movable block 54 upwardly, die elements 20 and 21 are urged apart by means of springs 82, 84 mounted about shafts 86 and 88 extending through blocks 78 and 80. As these die elements 20 and 21 are separated, the threaded strip advanced by mandrel 16 may pass through the area of heading and shearing prior to return of movable block 54 downwardly and closing of the die elements about that portion of the threaded screw strip from which the head and shear point are to be formed.

As will be apparent, the screw head 74 may be formed in any configuration and may be formed in one or more steps in the manner of forming the shear point. Also, if additional abutting action is required, additional shear points can be devised so as to abut the leading end of the screw as it advances and to hold it against the setting up of the screw head by advancement of mandrel 12.

Manifestly, interior threaded portion 18 of mandrel 12 may extend for virtually any length of the screw strip. Because it fully engages threads 72 there is no danger of distortion or damage of the threads during the heading operation. In fact advancement of the threads 72 through the rotating threaded portion 18 can actually serve to improve the threads by removing burrs, impurities and the like.

Manifestly, various types of limit switch, feeding control and mandrel driving means may be employed without departing from the spirit and scope of invention, as defined in the subjoined claims.

I claim:

1. Method of forming a co-axially aligned continuous strip of screws from threaded screw stock comprising:
  (A) advancing a strip of stock having threads;
  (B) grabbing longitudinally spaced portions of said threads and urging at least one spaced portion of thread axially towards the other so as to set up an intermediate screw head.

2. Method of forming a co-axially aligned continuous strip of screws from threaded screw stock comprising:
  (A) advancing a strip of stock having threads;
  (B) engaging a posterior portion of said threads;
  (C) abutting an anterior portion of said stock; and
  (D) axially forcing said posterior portion against said anterior portion so as to set up an intermediate screw head.

3. Method of forming a co-axially aligned continuous strip of screws from threaded screw stock, as in claim 2, including setting up a locking protuberance on the underside of said screw head.

4. Method of forming a co-axially aligned continuous strip of screws from threaded screw stock, as in claim 2, wherein said heads are set into rounds.

5. Method of forming a co-axially aligned continuous strip of screws from threaded screw stock as in claim 2, including forming a shear point in said screw immediately in front of said head.

6. Method of forming a co-axially aligned continuous strip of screws from threaded screw stock comprising:
  (A) advancing a strip of stock having threads;
  (B) circumferentially engaging a sustained posterior portion of said threads;
  (C) abutting an anterior portion of said threads, then
  (D) forcing said posterior portion of threads co-axially towards said abutted anterior portion;
  (E) confining a portion of said threads intermediate said posterior and anterior portions so as to set up within a confined area an intermediate screw head.

7. Method of forming a co-axially aligned continuous strip of screws from threaded screw stock as in claim 6, wherein said abutting is against at least one previously formed screw head.

8. Method of forming a co-axially aligned continuous strip of screws from threaded screw stock, as in claim 7, including
  advancing said strip of stock by rotatably engaging said threads.

9. Method of forming a co-axially aligned continuous strip of screws from threaded screw stock as in claim 8 including:
  (E) coining a shear point in said stock anteriorally of said head.

10. Method of forming a co-axially aligned continuous strip of screws from threaded screw stock as in claim 8, including successively forcing said posterior portion against said anterior portion, so as to set up said head within two or more confined areas.

References Cited by the Examiner

UNITED STATES PATENTS

| | | | |
|---|---|---|---|
| 341,414 | 5/1886 | Fowler | 10—45 |
| 739,810 | 8/1903 | Baldenweg | 10—45 |

WILLIAM W. DYER, JR., *Primary Examiner.*

L. B. TAYLOR, *Assistant Examiner.*